United States Patent Office 2,917,519
Patented Dec. 15, 1959

2,917,519

PROCESS FOR THE MANUFACTURE OF AN AMINO-ACID

Robert Schwyzer, Riehen, Switzerland, assignor to Ciba Pharmaceutical Products, Inc., Summit, N.J.

No Drawing. Application September 11, 1957
Serial No. 683,206

Claims priority, application Switzerland
September 17, 1956

4 Claims. (Cl. 260—326.3)

This invention provides a new process for the manufacture of proline of the formula

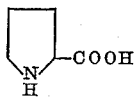

This product is of great technical importance, especially as an intermediate product for the production of polypeptides, for example, hypertensin.

The present invention is based on the observation that the aforesaid amino-acid can be made in a more advantageous manner than by the known process by treating with ammonia and hydrogen in the presence of a catalyst at a low temperature a member of the group consisting of $\alpha,\delta$-dioxo-valeric acid, its esters, especially lower alkyl esters, and mixtures of the acid with an ester, and if desired, splitting up the racemic proline so obtained into its optical antipodes.

In order to prepare the starting material a dialkoxy-tetrahydropyromicic acid ester, especially dimethoxy-tetrahydropyromucic acid lower alkyl ester as for example the methyl ester of the formula

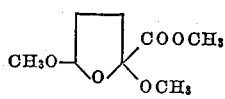

is advantageously treated with a cation exchanger in the H+-form, for example with Dowex 50 (registered trademark). The hydrolysis may also be carried out by means of a dilute acid, such as dilute hydrochloric acid. By this hydrolysis there is obtained $\alpha:\delta$-dioxo-valeric acid of the formula

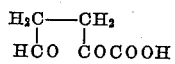

or an ester or mixture thereof. In carrying out the process it is not essential to isolate these compounds, and the hydrolysis mixture may be used.

In accordance with the present invention the treatment with ammonia and hydrogen is carried out at a low temperature, for example, at 0° C. It has been found that at higher temperatures, for example, 100° C., pyrrole carboxylic acid derivatives are formed instead of the desired proline. As catalysts there are especially suitable those of the eighth group of the periodic system, for example, Raney nickel. The reaction is advantageously carried out in an aqueous medium and under pressure. However, the reaction can be carried out in another medium, for example, in the presence of an alcohol. The customary methods can be used for splitting up the racemate so obtained.

The following example illustrate the invention:

*Example*

1 cc. of dimethoxy-tetrahydropyromucic acid methyl ester is hydrolyzed for 5 hours at 20° C. with 1 gram of Dowex 50 (registered trademark, a cation exchanger in the H+-form) in 20 cc. of water. The reaction mixture containing a mixture of $\alpha,\delta$-dioxo-valeric acid and its methyl ester is then cooled to 0° C., 0.5 cc. of concentrated ammonia solution and 0.5 gram of Raney nickel are added, and the mixture is agitated for 4 hours under 20–30 atmospheres pressure of hydrogen.

After the hydrogenation, the reaction mixture is subjected to adsorption on a cation exchanger in the H+-form. The adsorbent is washed with 250 cc. of a 2 N-solution of ammonia, and the ammoniacal solution is evaporated in vacuo. There are obtained 590 milligrams of a crude product, which according to colimetric determination contains 462 milligrams of proline, which corresponds to a yield of 65.5%. By recrystallization from a mixture of alcohol and ether there are obtained 450 milligrams of pure D:L-proline melting at 207° C. The latter product can be split up by the usual methods into D-proline and L-proline.

What is claimed is:

1. Process for the manufacture of an amino acid, wherein a member of the group consisting of $\alpha,\delta$-dioxo-valeric acid, its esters and mixtures of the acid with an ester is treated at a temperature up to about 100° C. with ammonia and hydrogen in the presence of a catalyst for the reaction, said catalyst being one of group VIII of the periodic system.

2. Process according to claim 1, wherein the hydrolysis product of the dimethoxy-tetrahydro-pyromucic acid methyl ester is used as starting material.

3. Process according to claim 1, wherein the hydrogenation is performed in the presence of Raney nickel.

4. Process for the manufacture of an amino acid wherein an $\alpha,\delta$-dioxo-valeric acid lower alkyl ester is treated at a temperature up to about 100° C. with ammonia and hydrogen in the presence of a catalyst for the reaction, said catalyst being one of group VIII of the periodic system.

References Cited in the file of this patent

UNITED STATES PATENTS 2,515,304  Jones _____ July 18, 1950

OTHER REFERENCES

Young et al.: Organic Synthesis, vol. 16, pp. 25–27 (1936).

Hazlewood et al.: Journal Proceedings Royal Society of New South Wales, March 1937, vol. 71, p. 92.

Rainey et al.: Journal Am. Chem. Soc. (1939), vol. 61, p. 1105.